US010336015B2

(12) United States Patent
Jacob et al.

(10) Patent No.: US 10,336,015 B2
(45) Date of Patent: Jul. 2, 2019

(54) ARRANGEMENT AND METHOD FOR PRODUCING A COMPOSITE MATERIAL COMPONENT

(71) Applicant: Airbus Operations GmbH, Hamburg (DE)

(72) Inventors: Torben Jacob, Hamburg (DE); Carsten Barlag, Hamburg (DE); Hauke Seegel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 424 days.

(21) Appl. No.: 15/148,006

(22) Filed: May 6, 2016

(65) Prior Publication Data

US 2016/0243771 A1 Aug. 25, 2016

Related U.S. Application Data

(63) Continuation of application No. PCT/EP2014/071953, filed on Oct. 14, 2014.

(30) Foreign Application Priority Data

Nov. 6, 2013 (EP) ..................................... 13191759

(51) Int. Cl.
*B29C 70/44* (2006.01)
*B29C 70/54* (2006.01)
(Continued)

(52) U.S. Cl.
CPC ........ *B29C 70/443* (2013.01); *B29C 43/3642* (2013.01); *B29C 51/18* (2013.01);
(Continued)

(58) Field of Classification Search
CPC ... B29C 70/443; B29C 70/54; B29C 43/3642; B29C 2043/3644
See application file for complete search history.

(56) References Cited

U.S. PATENT DOCUMENTS 3,726,953 A * 4/1973 Jones ...................... B29C 51/04
264/292
4,842,670 A * 6/1989 Callis .................. B29C 43/3642
156/285

(Continued)

FOREIGN PATENT DOCUMENTS

DE 102005011977 2/2006
DE 102007061431 6/2009

(Continued)

OTHER PUBLICATIONS

Partial machine translation of Brendenberg et al, DE 10 2005 011 977 A1, Feb. 16, 2006 obtained from the espace website. (Year: 2006).*

*Primary Examiner* — Robert B Davis
(74) *Attorney, Agent, or Firm* — Greer, Burns & Crain, Ltd.

(57) ABSTRACT

An arrangement for producing a composite material component comprises a bagging configured to seal a receiving space for a semi-finished part against the ambient atmosphere. The bagging is a thermoformed bagging having a shape which, at least in sections, corresponds to a shape of the semi-finished part and which comprises an air-tight outer layer and an inner separation layer. The inner separation layer is configured to allow the bagging to be separated from the composite material component made from the semi-finished part. The arrangement further comprises a vacuum source connected to the receiving space and configured to generate a reduced pressure within the receiving space. The arrangement also comprises a curing apparatus configured to cure a thermoset plastic material either contained in at least one element of the semi-finished part or injected into the receiving space when the semi-finished part is sealed within the receiving space via the bagging.

20 Claims, 2 Drawing Sheets

(51) Int. Cl.
*B29C 43/36* (2006.01)
*B29C 51/18* (2006.01)
*B65B 3/02* (2006.01)
*B65B 7/02* (2006.01)
*B65B 31/00* (2006.01)
*B65B 63/08* (2006.01)
*B29L 31/30* (2006.01)

(52) U.S. Cl.
CPC .............. *B29C 70/54* (2013.01); *B65B 3/022* (2013.01); *B65B 7/02* (2013.01); *B65B 31/00* (2013.01); *B65B 63/08* (2013.01); *B29C 2043/3644* (2013.01); *B29K 2867/003* (2013.01); *B29K 2877/00* (2013.01); *B29L 2031/3076* (2013.01)

(56) References Cited

U.S. PATENT DOCUMENTS

| | | | | |
|---|---|---|---|---|
| 5,087,193 | A * | 2/1992 | Herbert, Jr. | B29C 33/50 264/257 |
| 5,129,813 | A | 7/1992 | Shepherd | |
| 5,252,279 | A * | 10/1993 | Gore | B29C 70/545 264/154 |
| 5,759,591 | A * | 6/1998 | Rhoades | B29C 51/087 156/285 |
| 5,807,593 | A * | 9/1998 | Thompson | B29C 43/12 264/316 |
| 6,296,803 | B1 * | 10/2001 | Darr | B29C 49/02 264/513 |
| 7,029,267 | B2 * | 4/2006 | Caron | B29C 43/12 156/382 |
| 2008/0182054 | A1 | 7/2008 | Ridges et al. | |
| 2010/0098889 | A1 * | 4/2010 | Williams, IV | B29C 61/006 428/34.9 |
| 2010/0151169 | A1 | 6/2010 | Dorawa et al. | |
| 2010/0314042 | A1 | 12/2010 | Luebbering et al. | |
| 2011/0061450 | A1 * | 3/2011 | Toledo Garcia | G01M 3/227 73/49.3 |
| 2013/0014887 | A1 * | 1/2013 | Jagos | B29C 70/44 156/245 |

FOREIGN PATENT DOCUMENTS

| | | | |
|---|---|---|---|
| DE | 102008054540 | 6/2010 | |
| DE | 102008054544 | 6/2010 | |
| FR | 2897294 | 8/2007 | |
| WO | WO-9300404 A1 * | 1/1993 | ............ C08L 51/06 |
| WO | 2008086022 | 7/2008 | |

* cited by examiner

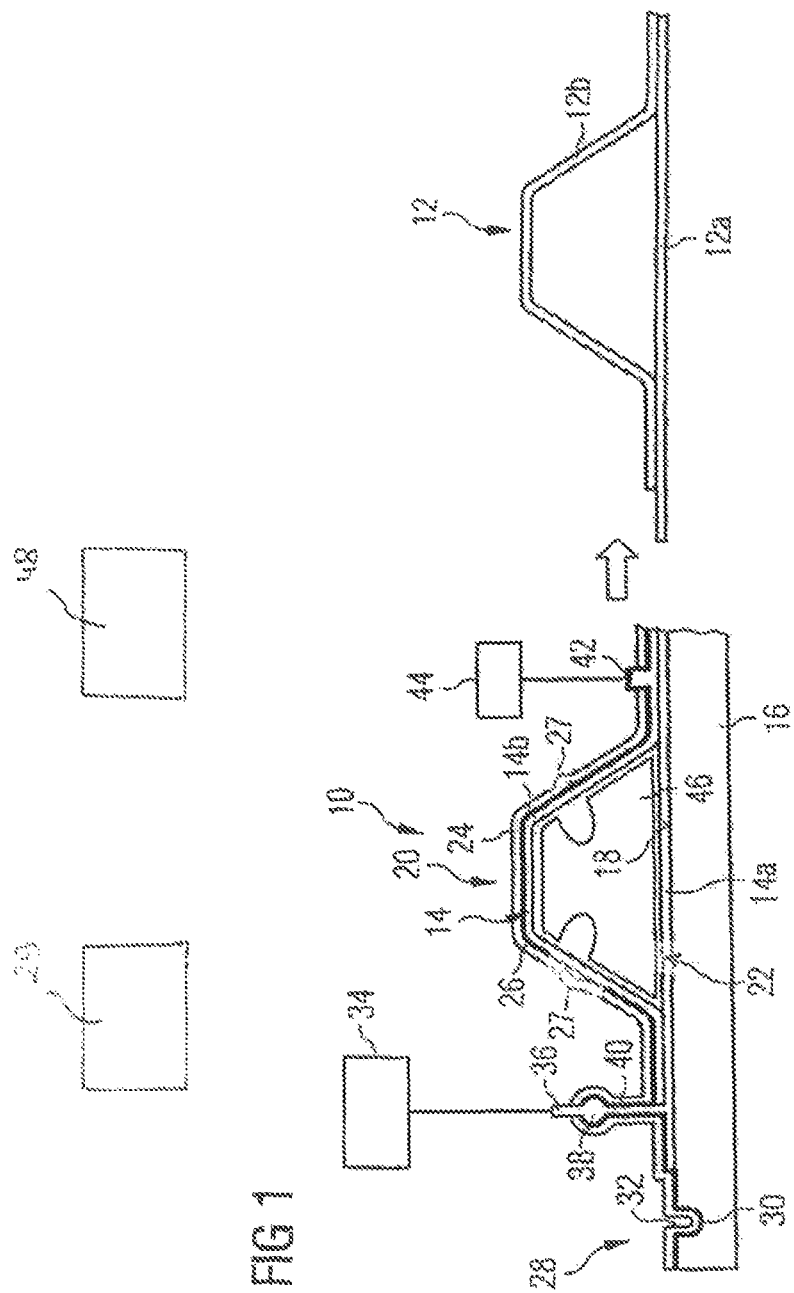

ARRANGEMENT AND METHOD FOR PRODUCING A COMPOSITE MATERIAL COMPONENT

CROSS-REFERENCES TO RELATED APPLICATIONS

This application is a continuation of International Application PCT/EP2014/071953 filed Oct. 14, 2014, designating the United States and published on May 14, 2015 as WO 2015/067440. This application also claims the benefit of the European patent application No. 13191759.3 filed on Nov. 6, 2013. The entire disclosures of the above are incorporated herein by way of reference.

BACKGROUND OF THE INVENTION

The invention relates to an arrangement and a method for producing a composite material component, in particular a composite material aircraft component.

For producing aircraft components from fiber-reinforced composite materials, a vacuum infusion process or a vacuum assisted resin transfer molding (RTM) process may be used. DE 10 2008 054 540 A1 describes a method for manufacturing an aircraft component comprising a stiffening element such as, for example, a stringer and a shell element from a fiber-reinforced composite material. In the method according to DE 10 2008 054 540 A1, semi-finished parts in the form of fiber prepregs are connected to each other, wherein a tube core made of a multilayer plastic foil material is inserted into a cavity formed between the semi-finished parts. The arrangement comprising the semi-finished parts and the tube core is enveloped by a vacuum bagging material setup consisting of a release film, a venting layer made of a polyamide fleece material and a vacuum foil and is introduced into an autoclave, wherein the resin material contained in the fiber prepregs is cured under an elevated pressure and/or an elevated temperature. During the autoclave process, an interior of the tube core is pressurized with ambient autoclave atmosphere such that the tube core provides for the application of an elevated pressure also upon surface portions of the semi-finished parts which face towards an interior of the cavity formed between the semi-finished parts. The tube core employed in the method for manufacturing an aircraft component according to DE 10 2008 054 540 A1 is manufactured in a thermoforming process described in DE 10 2008 054 544 A1 and US 2010/0151169 A1.

SUMMARY OF THE INVENTION

The invention is directed at an object of specifying an arrangement and a method for producing a composite material component which allow a high quality composite material component to be produced in an easy and cost-effective manner.

An arrangement for producing a composite material component comprises a bagging configured to seal a receiving space for receiving a semi-finished part against the ambient atmosphere. The semi-finished part may comprise only one element or may comprise a plurality of elements which are intended to be connected to each other so as to form the composite material component. The semi-finished part may comprise reinforcing fibers in the form of single fibers, fiber prewovens or fiber prepregs. The bagging may envelope only the semi-finished part and hence seal a receiving space which, in its entirety, is defined by the bagging. It is, however, also conceivable that the bagging is configured to seal a receiving space which, at least partially, is defined by a tool or a mold receiving the semi-finished part.

The bagging of the arrangement for producing a composite material component is a thermoformed bagging, i.e., a polymeric bagging setup which has a strength and stiffness such that the bagging, at least in sections, is dimensionally stable at least at room temperature and which is brought into the desired shape in a reliable and cost-effective manner by a non-reactive thermoforming process. The bagging has a shape which, at least in sections, corresponds to the shape of the semi-finished part. In other words, the shape of the bagging is adjusted to an outer contour of the semi-finished part allowing the bagging to closely abut against and/or snugly fit to an outer surface of the semi-finished part. The bagging comprises an air-tight outer layer which ensures that the bagging is configured to seal the receiving space against the ambient atmosphere. Further, the bagging comprises an inner separation layer which is connected to the air-tight outer layer and forms a surface of the bagging facing the semi-finished part received in the receiving space. The inner separation layer is configured to allow the bagging to be separated from the composite material component made from the semi-finished part.

The arrangement further comprises a vacuum source which is connected to the receiving space and configured to generate a reduced pressure within the receiving space. The vacuum source, for example, may be designed in the form of a pump which is suitable to draw gas from the receiving space and to generate a pressure within the receiving space which is lower than the ambient pressure of the ambient atmosphere surrounding the receiving space.

Finally, the arrangement comprises a curing apparatus adapted to cure a thermoset plastic material which is already contained in the semi-finished part when the semi-finished part is sealed within the receiving space by means of the bagging and/or which is injected into the receiving space when the semi-finished part is sealed within the receiving space by means of the bagging. The thermoset plastic material may, for example, be a resin material. Thus, the composite material component is obtained by curing the thermoset plastic material contained in the semi-finished part or injected into the receiving space when the semi-finished part is sealed within the receiving space by means of the bagging. The curing of the thermoset plastic material may be achieved under an elevated pressure and/or under an elevated temperature. The curing apparatus may, for example, be designed in the form of an autoclave.

The disposable thermoformed bagging of the arrangement for producing a composite material component dispenses with the need to drape a vacuum foil for sealing the semi-finished part received within the receiving space against the ambient atmosphere. Instead, the bagging can simply be placed on top of the semi-finished part and at least partially fulfil a shape-giving or shape-stabilizing function, for example during curing of a thermoset plastic material contained in the semi-finished part. It is, however, also conceivable that the bagging, together with the semi-finished part, is placed within a mold which serves to stabilize the shape of the semi-finished part, for example during curing of the thermoset plastic material contained in the semi-finished part or injected into the receiving space when the semi-finished part is sealed within the receiving space by means of the bagging.

Further, the bagging fulfils the double-function to not only seal the receiving space for receiving the semi-finished part against the atmosphere, e.g., during evacuating the receiving space, but also to allow the bagging to be separated from the composite material component made from the semi-finished part in a simple and reliable manner. Hence, the provision of additional separation means such as a separation foil or the like between the semi-finished part and the bagging can be dispensed with. Further, by using a pre-formed bagging, an edge-sealing step, i.e., a step for sealing edges of the composite material component made from the semi-finished part by applying additional thermoset plastic material to the edges and curing the thermoset plastic material can be performed during the production process. The arrangement for producing a composite material component thus allows the production of a high quality composite material component in a highly automated and easy to handle process in a near net shape quality. Hence, the composite material component can be manufactured in a particularly cost-effective manner.

For manufacturing the bagging of the arrangement for producing a composite material component, the materials which are intended to form the air-tight outer layer and the inner separation layer of the bagging may be coextruded so as to provide the bagging with the desired double-layer structure. Thereafter, the bagging, in a thermoforming process, is brought into the desired shape. A flat foil extruder may be used for coextruding the still unshaped bagging.

The arrangement for producing a composite material component may further comprise a supporting tool which is configured to support the semi-finished part and which has a supporting surface. A shape of the supporting surface of the supporting tool may, at least in sections, correspond to a shape of a surface of the semi-finished part resting on the supporting surface when the semi-finished part is supported on the supporting tool. The supporting tool may be connectable to the bagging in a sealing manner. The receiving space for receiving the semi-finished part thus may be defined by the supporting tool and the bagging. The supporting tool may be any suitable tool which is configured to support the semi-finished part. For example, the supporting tool may be designed in the form of a mold wherein enforcing fibers and/or a thermoset plastic material may be introduced.

A sealing device for connecting the supporting tool to the bagging in a sealing manner may comprise a sealing groove formed in the supporting tool. Preferably, the sealing groove is formed in the supporting surface of the supporting tool. Further, the sealing device may comprise a sealing bead formed in the bagging. In particular, the sealing bead is integrally formed with the bagging and configured to be received within the sealing groove formed in the supporting tool when the supporting tool and the bagging are connected to each other in a sealing manner so as to define the receiving space for receiving the semi-finished part. Preferably, the sealing groove and the sealing bead are designed so as to allow the sealing bead to be drawn into the sealing groove when the vacuum source draws gas from the receiving space and hence generates a reduced pressure within the receiving space. Alternatively, it is, however, also conceivable to provide the sealing device for connecting the supporting tool to the bagging in a sealing manner with a protruding element protruding from the supporting surface of the supporting tool, in particular a mushroom shaped protruding element which is adapted to interact with the bagging in order to connect the supporting tool to the bagging in a sealing manner.

The bagging may comprise at least one venting line which is integrally formed with the bagging. For example, the venting line may be formed within the bagging during thermoforming the bagging. In particular, in case large sized semi-finished parts should be processed in the arrangement for producing the composite material component, a plurality of venting lines may be formed within the bagging. A flow cross-section of the at least one venting line preferably is adapted to the desired gas flow from the receiving space.

The at least one venting line may be connected to the receiving space via at least one channel which, like the venting line itself, may be integrally formed with the bagging. Like the venting line, the at least one channel may be formed during thermoforming the bagging. Preferably, the at least one channel extends substantially perpendicular to a longitudinal axis of the venting line. For example, the at least one channel may have a length of approximately 3 mm and a width of approximately 0.3 mm, wherein the extension of the at least one channel in the width direction preferably is smaller than a diameter of the at least one venting line.

The at least one venting line and/or the at least one channel may be provided, at an inner surface thereof, with a temperature resistant liner which may be integrated during thermoforming the bagging. The temperature resistant liner may avoid collapsing of the at least one channel and/or the at least one venting line when the bagging, for example during an autoclave process for curing a thermoset plastic material contained in the semi-finished part or injected into the receiving space when the semi-finished part is sealed within the receiving space by means of the bagging, is exposed to high temperatures. If desired or necessary, additional venting means, for example in the form of porous venting mats, may be placed in the receiving space or molded into the bagging.

The at least one venting line and/or the at least one channel preferably is arranged in a region of the bagging which, in the arrangement for producing a composite material component, is disposed adjacent to a step or other shape irregularity of the semi-finished part. In other words, if possible, the positioning of the at least one venting line and/or the at least one channel adjacent to a smooth section of the surface of the semi-finished part should be avoided in order to prevent the formation of irregularities in the surface of the composite material component made from the semi-finished part due to the smooth surface portion not being in direct contact with the bagging during curing the thermoset plastic material contained in the semi-finished part or injected into the receiving space when the semi-finished part is sealed within the receiving space by means of the bagging.

The bagging of the arrangement for producing a composite material component may further comprise at least one reinforcing element which may be integrally formed with the bagging. For example, the reinforcing element may be designed in the form of a reinforcing corrugation which is integrally formed with the bagging. In particular, the reinforcing corrugation may be formed upon thermoforming the bagging. If desired or necessary, further reinforcing elements which are formed separate from the bagging may be used to further increase the stiffness and/or the strength of the bagging. For example, reinforcing rods which may, for example, be made of carbon fiber reinforcing plastic material, may be inserted into reinforcing corrugations integrally formed with the bagging.

Further, the bagging may comprise a first connecting port which is configured to be connected to the vacuum source. Hence, via the first connecting port, gas may be drawn from the receiving space, wherein the first connecting port provides for a reliable connection between the receiving space and the vacuum source. Similar to the at least one venting line and the at least one reinforcing element, also the first connecting ports may be formed integrally with the bagging, for example during thermoforming the bagging. It is, however, also conceivable to provide the bagging with a first connecting port which is formed as a separate component, but is sealingly connected to the bagging, preferably molded into the bagging, for example after thermoforming a region of the bagging where the first connecting port should be provided as desired, by cutting an opening into the bagging and by arranging the first connecting port in place.

Further, the bagging may comprise a second connecting port which is configured to be connected to a thermoset plastic material source. Hence, via the second connecting port, thermoset plastic material from the thermoset plastic material source may be injected into the receiving space sealed by the bagging. Again, the second connecting port may be formed integrally with the bagging or may be provided in the form of a separate component which is sealingly connected to the bagging, preferably molded into the bagging.

A positioning element simplifying the positioning of a connection port on the bagging may be formed integral with the bagging either in the region of an outer surface of the bagging or in the region on an inner surface of the bagging. In addition, the bagging may comprise any desired functional insert. Reinforcing elements formed separate from the bagging, the first connecting port, the second connecting port and/or another functional insert may be connected to the bagging, e.g., by means of a double sided adhesive tape which is activated during thermoforming the bagging. The connection may be achieved by either placing the reinforcing elements, the first connecting port, the second connecting port and/or the other functional insert into the mold already during thermoforming the bagging or by connecting the reinforcing elements, the first connecting port, the second connecting port and/or the other functional insert to the thermoformed bagging after completion of the thermoforming process.

Moreover, at least one fold may be formed integrally with the bagging. The fold may be unfolded so as to increase the surface area of the bagging, for example, in order to allow compensating for dimensional or positioning tolerances of the semi-finished part. It is, however, also conceivable to fold the bagging while producing a composite material component, e.g., in order to compensate for thermal expansion of the bagging.

The bagging may have a thickness in a range of approximately 0.2 to 2.0 mm, preferably in a range of approximately 0.3 to 1.0 mm, and more preferably in the range of approximately 0.5 to 0.7 mm. In particular, the bagging may have a thickness of approximately 0.5 mm. A bagging having this thickness may be manufactured with the desired dimensional stability, strength and specific stiffness, while still being relatively lightweight and easy to handle. The bagging may, at least in sections, be transparent. In case the bagging, at least in sections, is made of a transparent material, quality control regarding correct positioning of the semi-finished part or, for example, the observation of a thermoset plastic material injection process is simplified.

In particular, in case the arrangement for producing a composite material component should be used for producing a large size composite material component, the bagging may comprise a plurality of bagging segments. The individual bagging segments may be connected to each other in a sealing manner. For example, the bagging segments may be connected to each other by welding, an adhesive tape and/or a zip fastener. If possible, joint regions between adjacent bagging segments should be positioned relative to the semi-finished part received within the receiving space such that they are not in direct contact with a surface, in particular a smooth (uncured) surface portion of the semi-finished part. For example, joint regions between adjacent bagging segments may be positioned adjacent to steps or other shape irregularities formed in the semi-finished part or in the region of stiff reinforcing elements of the bagging in order to prevent the formation of irregularities in the surface of the composite material component made from the semi-finished part.

The air-tight outer layer of the bagging may be made of a polyamide (PA) material, in particular a polyamide-6 material or a polyamide-6/polyamide 6.6 blend material. A polyamide material provides for the desired sealing properties of the air-tight outer layer. Further, a bagging comprising an air-tight outer layer made of a polyamide material has the strength and stiffness which is necessary to provide the bagging with the desired dimensional stability. The inner separation layer of the bagging may be made of an ethylene-tetrafluorethylene (ETFE) material. An ethylene-tetrafluorethylene material distinguishes by excellent separation properties which allow the bagging to be separated from the composite material component made from the semi-finished part in a particularly easy manner.

In case the air-tight outer layer of the bagging is made of a polyamide material and the inner separation layer is made of an ethylene-tetrafluorethylene material, the two layers are made of materials have different melting temperatures, i.e., the ethylene-tetrafluorethylene material used for making the inner separation layer has a higher melting temperature than the polyamide material used for making the air-tight outer layer. As a result, the ethylene-tetrafluorethylene layer, during the thermoforming process, acts as a stabilizing carrier layer for the polyamide layer, thus enhancing the thermoforming properties of the double-layer structure.

As an alternative, the air-tight outer layer of the bagging may be made of a polyethylenterephtalat (PET) material, in particular a c-polyethylenterephtalat material, i.e., a polyethylenterephtalat material which, by a tempering treatment at a temperature of approximately 140° C., can be brought into a partially crystallized state. This material is particularly suitable for low temperature applications, e.g., wind energy and leisure application. The inner separation layer of the bagging then preferably is a polymeric separation layer which may be applied to the air-tight outer layer by a plasma treatment. It is, however, also conceivable to combine an air-tight outer layer made of a polyamide material with a polymeric inner separation layer which may be applied to the air-tight outer layer by a plasma treatment. This material combination would be particularly suitable for aircraft applications. Furthermore, it is conceivable to combine an air-tight outer layer made of a polyethylenterephtalat material with an inner separation layer made of an ethylene-tetrafluorethylene material.

The air-tight outer layer of the bagging preferably has a thickness which is greater than a thickness of the inner separation layer of the bagging. Such a structure of the bagging not only ensures that the bagging has the desired strength and stiffness, but also allows the bagging to be produced in a particularly cost-effective manner, since the costs for the material used to form the air-tight outer layer usually are lower than the costs for the material used to form the inner separation layer. The materials used for making the air-tight outer layer and the inner separation layer of the bagging, as well as the thicknesses of these layers, may be selected in such a manner that the stiffness of the bagging decreases with increasing temperature in a specific amount. In particular, the materials used for making the bagging and the structure of the bagging may be selected in such a manner that the bagging somewhat "softens" at a temperature at or below a curing temperature of a thermoset plastic material contained in semi-finished part or injected into the receiving space when the semi-finished part is sealed within the receiving space by means of the bagging, for example, a temperature of approximately 120° C. to 180° C. The bagging then closely follows the outer contour of the semi-finished part, for example, in order to compensate for dimensional or positioning tolerances of the semi-finished part, also in areas of prior cavities.

The arrangement preferably further comprises a thermoforming apparatus for thermoforming the bagging. In particular, the thermoforming apparatus may comprise a forming tool adapted to support the bagging to be shaped on a surface thereof. Preferably, the shape of the forming tool is closely adapted to the shape of the semi-finished part to be processed so as to form the composite material component with the aid of the thermoformed bagging. Further, the forming tool may be slightly larger than the bagging to be produced, e.g., 0.9% larger, in order to compensate for shrinkage of the bagging upon being cooled after completion of the thermoforming process. Further, the thermoforming apparatus may comprise a heating device adapted to heat the bagging supported on the surface of the forming tool such that the bagging assumes a shape corresponding to the surface of the forming tool. The heating device may be configured and arranged so as to radiate heat onto a surface of the bagging which faces away from the forming tool. It is, however, also conceivable to integrate the heating device into the forming tool such that the heat provided by the heating device is introduced into the bagging via the surface of the bagging which rests on the surface of the forming tool. Further, the heating device may be designed to as to radiate heat onto both main surfaces of the bagging.

The thermoforming apparatus may further comprise a carrier which is provided with an opening and which is adapted to carry the bagging to be shaped in such a manner that the bagging extends across the opening formed in the carrier. The bagging may be attached to a region of the carrier surrounding the opening, for example by means of an adhesive tape. Further, the thermoforming apparatus may comprise a displacement device adapted to displace the forming tool between a rest position, wherein in the forming tool is disposed at a distance from the opening formed in the carrier, and an operating position, wherein the forming tool protrudes through the opening formed in the carrier. In particular, the displacement device may be adapted to displace the forming tool relative to the carrier and thus the opening formed in the carrier in a vertical direction.

Moreover, the thermoforming apparatus may comprise a pretensioning device adapted to pretension the bagging extending across the opening formed in the carrier. For example, the pretensioning device may be designed in the form of a blower which blows air or another suitable fluid onto the surface of the bagging extending across the opening formed in the carrier before the forming tool is brought into contact with the bagging. The pretensioning of the bagging ensures that the bagging snuggly fits to the surface of the forming tool when the forming tool finally, be means of the displacement device, is brought into its operating position wherein it receives the bagging on its surface. Finally, the thermoforming apparatus may comprise a suction device adapted to generate a reduced pressure in a space between the bagging and the surface of the forming tool on which the bagging is supported. By generating a reduced pressure in a space between the bagging and the surface of the forming tool on which the bagging is supported, the bagging is brought into close contact with the surface of the forming tool. As a result, the bagging assumes the contour of the surface of the forming tool in a reliable manner.

In a method for producing a composite material component, a bagging is thermoformed in such a manner that the bagging assumes a shape which, at least in sections, corresponds to the shape of a semi-finished part and which comprises an air-tight outer layer and an inner separation layer, the inner separation layer being configured to allow the bagging to be separated from the composite material component made from the semi-finished part. A receiving space for receiving a semi-finished part is sealed against the ambient atmosphere by means of the bagging. A vacuum source is connected to the receiving space. A reduced pressure is generated within the receiving space by drawing gas from the receiving space by means of the vacuum source. A thermoset plastic material which is contained in at least one element of the semi-finished part and/or which is injected into the receiving space when the semi-finished part is sealed within the receiving space by means of the bagging is cured.

The semi-finished part may be supported by a supporting tool having a supporting surface, wherein a shape of the supporting surface, at least in sections, may correspond to a shape of a surface of the semi-finished part resting on the supporting surface. The supporting tool may be connected to the bagging in a sealing manner.

A sealing device for connecting the supporting tool to the bagging, in the method for producing a composite material component, may comprise a sealing groove formed in the supporting tool, in particular in the supporting surface of the supporting tool, and a sealing bead formed in the bagging. The sealing bead formed in the bagging preferably is received within the sealing groove formed in the supporting tool, in particular due to the reduced pressure generated within the receiving space by means of the vacuum source. In other words, the sealing bead formed in the bagging, preferably is brought into engagement with the sealing groove formed in the supporting tool in a reduced pressure driven manner.

The method for producing a composite material component may further comprise a step of drawing gas from the receiving space by means of the vacuum source via at least one venting line integrally formed with the bagging. The venting line may be connected to the receiving space via at least one channel integrally formed with the bagging and preferably extending substantially perpendicular to a longitudinal axis of the venting line. Further, gas may be drawn from the receiving space by means of the vacuum source via a first connecting port of the bagging. The first connecting port, in particular, may be connected to the at least one venting line. A thermoset plastic material from a thermoset plastic material source may be injected into the receiving space via a second connecting part of the bagging. At least one fold integrally formed with the bagging may be unfolded in order to adjust the shape of the bagging more closely to the shape of the semi-finished part.

The bagging used in the method for producing a composite material component may have a thickness in the range of approximately 0.2 to 2.0 mm, preferably in the range of approximately 0.3 to 1.0 mm, and more preferably in the range of approximately 0.5 to 0.7 mm. In particular, the bagging may have a thickness of approximately 0.5 mm. The bagging may be, at least in sections, transparent. Further, the bagging may comprise a plurality of bagging segments which are connected to each other in a sealing manner.

The air-tight outer layer of the bagging employed in the method of producing a composite material component may be made of a polyamide material, in particular, a polyamide-6 material or a polyamide-6/polyamide 6.6 blend material. The inner separation layer of the bagging may be made of an ethylene-tetrafluorethylene material. The air-tight outer layer of the bagging may have a thickness which is greater than a thickness of the inner separation layer of the bagging. The materials used for making the air-tight outer layer and the inner separation layer of the bagging, as well as the thicknesses of the air-tight outer layer and the inner separation layer, may be selected in such a manner that the stiffness of the bagging decreases with increasing temperature.

Upon thermoforming the bagging, the bagging to be shaped may be supported by a surface of a forming tool of a thermoforming apparatus. Further, the bagging supported on the surface of the forming tool may be heated such that the bagging assumes a shape corresponding to the surface of the forming tool.

Moreover, upon thermoforming the bagging, the bagging to be shaped may be applied onto a carrier which is provided with an opening in such a manner that the bagging extends across the opening formed in the carrier. The forming tool may be displaced between a rest position, wherein the forming tool is disposed at a distance from the opening formed in the carrier, and an operating position, wherein the forming tool protrudes through the opening formed in the carrier. The bagging extending across the opening formed in the carrier may be pretensioned. A reduced pressure may be generated in a space between the bagging and the surface of the forming tool on which the bagging is supported.

An arrangement described above and/or a method described above may be used in a particularly favorable manner for producing a composite material aircraft component.

BRIEF DESCRIPTION OF THE DRAWINGS

Preferred embodiments of the invention now are described in greater detail with reference to the appended schematic drawings, wherein FIG. 1 shows an arrangement for producing a composite material component.

DETAILED DESCRIPTION OF THE PREFERRED EMBODIMENTS

Figure 2A:
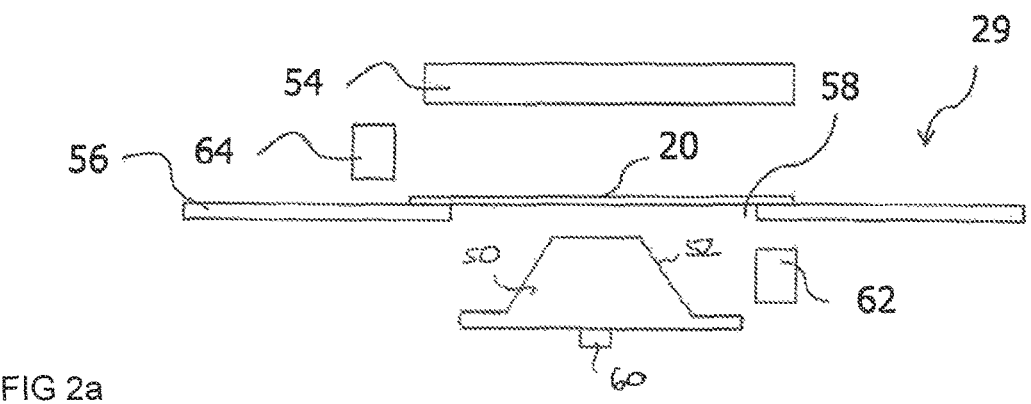
FIGS. 2a, 2b, and 2c show a schematic view of a thermoforming apparatus employed in the arrangement for producing a composite material component according to FIG. 1 for thermoforming a bagging.

The arrangement 10 depicted in FIG. 1 serves to produce a composite material component 12. In the exemplary embodiment of the arrangement 10 according to FIG. 1, the composite material component 12 is an aircraft component, in particular, a section of an aircraft outer shell 12a provided with a reinforcing component 12b designed in the form of a stringer. Although the aircraft outer shell section 12a, in the schematic view of FIG. 1 has a planar shape, the aircraft outer shell section 12a may have a suitable curvature. Similarly, also the second element 12b, which in the embodiment of an arrangement 10 as depicted in FIG. 1 is designed in the form of an omega stringer, also may have a different shape and may, for example, be designed in the form of T-profile. The composite material component 12 is made from a semi-finished part 14 comprising a first element 14a intended to form the aircraft outer shell section 12a and a second element 14b intended to form an outer contour of the reinforcing component 12b.

In the embodiment of an arrangement 10 as depicted in FIG. 1, the first and the second element 14a, 14b of the semi-finished part 14 are made of a fiber prepreg comprising reinforcing fibers impregnated with a thermoset plastic material such as, for example, a resin material. In the first and the second element 14a, 14b of the semi-finished part 14, the thermoset plastic material still is in an uncured state. The first and the second element 14a, 14b of the semi-finished part 14 thus, in the arrangement 10, are processed in a wet/wet state. In this regard, it should, however, be noted that one of the first and the second element 14a, 14b of the semi-finished part 14 may contain a thermoset plastic material which is already cured. Further, it is conceivable to provide at least one of the elements 14a, 14b of the semi-finished part 14 in the form of a fiber arrangement into which a thermoset plastic material may be injected during processing the semi-finished part 14 in the arrangement 10.

The arrangement 10 comprises a supporting tool 16 having a smooth supporting surface 18. The supporting tool 16 serves to support the semi-finished part 14 and may be designed in the form of a machined aluminum component. In particular, the semi-finished part 14 rests upon the supporting surface 18 of the supporting tool 16, wherein a shape of the supporting surface 18 corresponds to a shape of a surface of the semi-finished part 14 resting on the supporting surface 18. In other words, the shape of the supporting surface 18 is adapted to a surface of the first element 14a of the semi-finished part 14 which rests on the supporting surface 18.

The arrangement 10 further comprises a bagging 20 which is connected to the supporting tool 16 in a sealing manner. The bagging 20 and the supporting tool 16 thus define therebetween a receiving space 22 for receiving the semi-finished part 14. The bagging 20 is a thermoformed bagging 20, i.e., is dimensionally stable. A shape of the thermoformed bagging 20 corresponds to the shape of the semi-finished part 14 in such a manner that the thermoformed bagging 20 exactly fits to a surface of the semi-finished 14 which faces away from the supporting tool 16.

The bagging 20 comprises an air-tight outer layer 24 which provides for the desired sealing properties as well as for a desired strength and stiffness of the bagging 20. The air-tight outer layer 24 is connected to an inner separation layer 26 which faces the semi-finished part 14. The inner separation layer 26 is configured to allow the bagging 20 to be separated from the composite material component 12 made from the semi-finished part 14 by curing the thermoset plastic material contained in the semi-finished part 14.

The bagging 20 employed in the exemplary embodiment of an arrangement 10 depicted in FIG. 1 has a thickness of approximately 0.5 mm, wherein the thickness of the air-tight outer layer 24 is greater than a thickness of the inner separation layer 26. The air-tight outer layer 24 of the bagging 20 is made of a polyamide-6 material, wherein the inner separation layer 26 of the bagging 20 is made of an ethylene-tetrafluorethylene material. The polyamide-6 material used for the air-tight outer layer 24 and the ethylene-tetrafluorethylene material used for making the inner separation layer 26 are transparent materials, thus allowing a visual quality control, for example regarding a correct positioning of the semi-finished part 14 within the receiving space 22 defined between the supporting tool 16 and the bagging 20. In order to increase the strength and stiffness, the bagging 20 is provided with integrally formed reinforcing elements 27. The reinforcing elements 27, in the exemplary embodiment of an arrangement 10 depicted in FIG. 1, are designed in the form of a reinforcing corrugation.

Figure 2B:
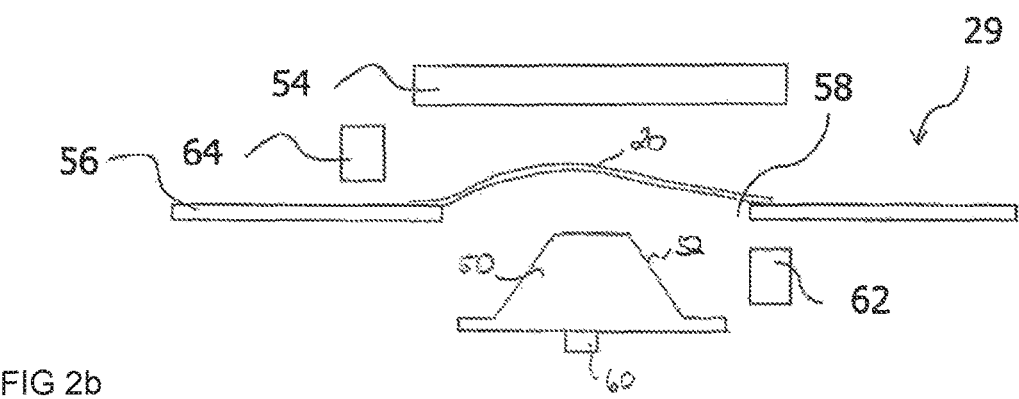
Figure 2C:
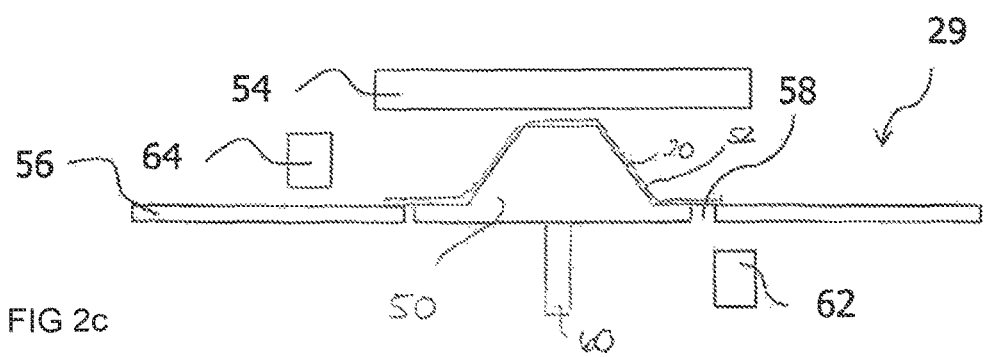

The double-layered bagging 20 is manufactured by first coextruding a polyamide-6 material and an ethylene-tetrafluorethylene material so as to produce a foil having the desired double-layered structure. Thereafter, the foil, by a thermoforming process, is brought into the desire shape in dependence on the shape of the semi-finished part 14 intended to be processed by means of the arrangement 10 with the aid of a thermoforming apparatus 29, a detailed view of which is shown in FIGS. 2a, 2b and 2c, and which is described further below.

The bagging 20 is connected to the supporting tool 16 in a sealing manner by means of a sealing device 28. The sealing device 28 comprises a sealing groove 30 formed in the supporting surface 18 of the supporting tool 16 and a sealing bead 32 integrally formed with the bagging 20. The sealing bead 32 is configured to be received within the sealing groove 30. In particular, the sealing bead 32 is brought into engagement with the sealing groove 30 by generating a reduced pressure within the receiving space 22. In order to reduce the pressure within the receiving space 22, a vacuum source 34, which is connected to the receiving space 22, is put into operation so as to draw gas from the receiving space 22.

The vacuum source 24, which is designed in the form of a vacuum pump, is connected to a first connecting port 36. The first connecting port 36 is molded into the bagging 20 and, in turn, is connected to a venting line 38 which is integrally formed with the bagging 20 during thermoforming of the bagging 20. In the exemplary embodiment of an arrangement 10 depicted in FIG. 1, the venting line 38 has a circular flow cross-section and extends substantially parallel to a step structure formed in the semi-finished part 14 in an edge region of the second element 14b. Hence, the venting line 38 is provided in a region of the bagging 20 which, in the arrangement 10, is not superimposed on a smooth surface region of the semi-finished part 14, but a region of the semi-finished part 14 having an irregular shape. Thus, the development of surface irregularities in the semi-finished part 14 during curing of the thermoset plastic material contained in the semi-finished part 14 and hence the development of surface irregularities in the composite material component 12 made from the semi-finished part 14 can be prevented.

The venting line 38 is connected to the receiving space 22 via a channel 40 which, like the venting line 38, is integrally formed with the bagging 20 upon thermoforming the bagging. The channel 40 extends along the edge region of the second element 14b of the semi-finished part 14 in a direction substantially perpendicular to surfaces of the first and the second element 14a, 14b of the semi-finished part 14 and substantially perpendicular to a longitudinal axis of the venting line 38.

The bagging 20 further comprises a second connecting port 42 which is connected to a thermoset plastic material source 44. Via the second connecting port 42, thermoset plastic material from the thermoset plastic material source 44 is injected into the receiving space 22, for example for sealing an edge of the semi-finished part 14. The second connecting port 42, like the first connecting port 36, is molded into the bagging 20.

Finally, the arrangement 10 comprises a tube core 46 which is arranged within a cavity defined between the first and the second element 14a, 14b of the semi-finished part 14. The tube core 46 is a tube core as described in DE 10 2008 054 540 A1 which is manufactured in a thermoforming process described in DE 10 2008 054 544 A1 and US 2010/0151169 A1. When the vacuum source 34 draws gas from the receiving space 22 via the channel 40, the venting line 38 and the first connecting port 36, the tube core 46 applies a pressure surfaces of the first and the second element 14a, 14b of the semi-finished part 14 which face the cavity thus maintaining the shape of the semi-finished part 14.

Finally, the arrangement 10 comprises a curing apparatus 48 which is adapted to cure the thermoset plastic material contained in the semi-finished part 14 and the thermoset plastic material injected into the receiving space 22 via the second connecting port 42. In the arrangement 10 according to FIG. 1, the curing apparatus 48 is designed in the form of an autoclave which allows the thermoset plastic material to be cured under an elevated pressure and an elevated temperature as desired.

The thermoforming apparatus 29 for thermoforming the bagging 20, which is employed in the arrangement 10 and which is shown in FIGS. 2a, 2b and 2c, comprises a forming tool 50 adapted to support the bagging 20 to be shaped on a surface 52 thereof. The shape of the forming tool 50, in particular the shape of the surface 52 of the forming tool 50, is closely adapted to the shape of the semi-finished part 14 to be processed so as to form the composite material component 12 with the aid of the thermoformed bagging 20. By using a forming tool 50 the surface 52 of which more or less corresponds to the surface of the semi-finished part 14 to be processed, the bagging 20 may be shaped so as to assume a negative shape of the of the semi-finished part 14 to be processed.

Further, the thermoforming apparatus 29 comprises a heating device 54 which is adapted to heat the bagging 20 supported on the surface 52 of the forming tool 50 such that the bagging 20, in a non-reactive thermoforming process, assumes a shape corresponding to the surface 52 of the forming tool 50. In the embodiment of a thermoforming apparatus 29 shown in FIGS. 2a, 2b and 2c, the heating device 54 is positioned above a carrier 56 for receiving the bagging 20 to be shaped and configured to radiate heat in the direction of the carrier 56.

The carrier 56 is provided with an opening 58. During operation of the thermoforming apparatus 29, the bagging 20 to be shaped is applied to the carrier 56 in such a manner that the bagging 20 extends across the opening 58 formed in the carrier 56. In particular, the bagging 20 is attached to a region of the carrier 56 surrounding the opening 58, for example by means of an adhesive tape. A displacement device 60 is adapted to displace the forming tool 50 relative to the carrier 56 and thus the opening 58 formed in the carrier 56 in a vertical direction between a rest position, see FIGS. 2a and 2b, and an operating position, see FIG. 2c. In its rest position, the forming tool 50 is disposed at a distance from the opening 58 formed in the carrier 56, i.e., below the carrier 56 and the opening 58 formed therein. To the contrary, in its operating position, the forming tool 50 protrudes through the opening 58 formed in the carrier 56.

Moreover, the thermoforming apparatus 29 comprises a pretensioning device 62 which is adapted to pretension the bagging 20 extending across the opening 58 formed in the carrier 56. In the embodiment of a thermoforming apparatus 29 shown in FIG. 2, the pretensioning device 62 is designed in the form of a blower which blows air onto the surface of the bagging 20 extending across the opening 58 formed in the carrier 56 before the forming tool 50 is brought into contact with the bagging 20, i.e., the bagging surface, see FIG. 2b. The pretensioning of the bagging 20 ensures that the bagging 20 snuggly fits to the surface 52 of the forming tool 50 when the forming tool 50 finally is brought into its operating position shown in FIG. 2c, wherein it receives the bagging 20 on its surface 52.

Finally, the thermoforming apparatus 29 comprises a suction device 64 which is adapted to generate a reduced pressure in a space between the bagging 20 and the surface 52 of the forming tool 50 on which the bagging 20 is supported. By generating a reduced pressure in said space, the bagging 20 is brought into close contact with the surface 52 of the forming tool 50 and assumes the contour of the surface 52 of the forming tool 50 in a particularly reliable manner.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An arrangement for producing a composite material component, the arrangement comprising:
 a bagging configured to seal a receiving space for receiving a semi-finished part against the ambient atmosphere, wherein the bagging is a thermoformed bagging having a shape which, at least in sections, corresponds to a shape of the semi-finished part and which comprises an air-tight outer layer comprising a first material and an inner separation layer comprising a second material, the inner separation layer being configured to allow the bagging to be separated from the composite material component made from the semi-finished part, wherein the first material is different from the second material,
 a vacuum source connected to the receiving space and configured to generate a reduced pressure within the receiving space, and
 a curing apparatus adapted to cure a thermoset plastic material which is at least one of contained in at least one element of the semi-finished part or is injected into the receiving space when the semi-finished part is sealed within the receiving space by the bagging.

2. The arrangement according to claim 1, further comprising
 a supporting tool configured to support the semi-finished part and having a supporting surface,
 wherein a shape of the supporting surface, at least in sections, corresponds to a shape of a surface of the semi-finished part resting on the supporting surface when the semi-finished part is supported on the supporting tool,
 wherein the supporting tool is connectable to the bagging in a sealing manner, and
 wherein a sealing device for connecting the supporting tool to the bagging in a sealing manner comprises a sealing groove formed in the supporting tool and a sealing bead formed in the bagging, the sealing bead formed in the bagging being configured to be received within the sealing groove formed in the supporting tool.

3. The arrangement according to claim 1, wherein the bagging comprises at least one of:
 at least one venting line integrally formed with the bagging, the venting line being connected to the receiving space via at least one channel integrally formed with the bagging and extending substantially perpendicular to a longitudinal axis of the venting line,
 at least one reinforcing element integrally formed with the bagging, the reinforcing element being designed in the form of a reinforcing corrugation integrally formed with the bagging,
 a first connecting port configured to be connected to the vacuum source,
 a second connecting port configured to be connected to a thermoset plastic material source, and
 at least one fold integrally formed with the bagging.

4. The arrangement according to claim 1, wherein the bagging has a thickness in the range of approximately 0.2 to 2.0 mm.

5. The arrangement according to claim 1, wherein the bagging is, at least in sections, transparent.

6. The arrangement according to claim 1, wherein the bagging comprises a plurality of bagging segments which are connected to each other in a sealing manner.

7. The arrangement according to claim 1, wherein the first material is made of a polyamide material.

8. The arrangement according to claim 1, wherein second material is made of an ethylene-tetrafluorethylene material.

9. The arrangement according to claim 1, wherein the air-tight outer layer of the bagging has a thickness which is greater than a thickness of the inner separation layer of the bagging.

10. The arrangement according to claim 1, wherein the first and second materials as well as the thicknesses of the air-tight outer layer and the inner separation layer, are selected in such a manner that the stiffness of the bagging decreases with increasing temperature.

11. The arrangement according to claim 1, further comprising a thermoforming apparatus for thermoforming the bagging, wherein the thermoforming apparatus comprises:
 a forming tool adapted to support the bagging to be shaped on a surface thereof, and
 a heating device adapted to heat the bagging supported on the surface of the forming tool such that the bagging assumes a shape corresponding to the surface of the forming tool.

12. The arrangement according to claim 11, wherein the thermoforming apparatus further comprises at least one of:
 a carrier provided with an opening and adapted to carry the bagging to be shaped in such a manner that the bagging extends across the opening formed in the carrier,
 a displacement device adapted to displace the forming tool between a rest position, wherein in the forming tool is disposed at a distance from the opening formed in the carrier, and an operating position, wherein the forming tool protrudes through the opening formed in the carrier,
 a pretensioning device adapted to pretension the bagging extending across the opening formed in the carrier, and
 a suction device adapted to generate a reduced pressure in a space between the bagging and the surface of the forming tool on which the bagging is supported.

13. A method for producing a composite material component, the method comprising:
   thermoforming a bagging in such a manner that the bagging assumes a shape which, at least in sections, corresponds to the shape of a semi-finished part and which comprises an air-tight outer layer comprising a first material and an inner separation layer comprising a second material, the inner separation layer being configured to allow the bagging to be separated from the composite material component made from the semi-finished part,
   sealing a receiving space for receiving the semi-finished part against the ambient atmosphere by means of the bagging,
   connecting a vacuum source to the receiving space and generating a reduced pressure within the receiving space by drawing gas from the receiving space by means of the vacuum source, and
   curing a thermoset plastic material which is at least one of contained in at least one element of the semi-finished part or is injected into the receiving space when the semi-finished part is sealed within the receiving space by means of the bagging.

14. The method according to claim 13, wherein the semi-finished part is supported by a supporting tool having a supporting surface,
   wherein a shape of the supporting surface, at least in sections, corresponds to a shape of a surface of the semi-finished part resting on the supporting surface,
   wherein the supporting tool is connected to the bagging in a sealing manner,
   wherein a sealing device for connecting the supporting tool to the bagging in a sealing manner comprises a sealing groove formed in the supporting tool and a sealing bead formed in the bagging, and
   wherein the sealing bead formed in the bagging is received within the sealing groove formed in the supporting tool, due the reduced pressure generated within the receiving space by means of the vacuum source.

15. The method according to claim 13, further comprising at least one of:
   drawing gas from the receiving space by means of the vacuum source via at least one venting line integrally formed with the bagging, the venting line being connected to the receiving space via at least one channel integrally formed with the bagging and extending substantially perpendicular to a longitudinal axis of the venting line,
   drawing gas from the receiving space by means of the vacuum source via a first connecting port of the bagging,
   injecting a thermoset plastic material from thermoset plastic material source into the receiving space via a second connecting port of the bagging, and
   unfolding at least one fold integrally formed with the bagging in order to adjust the shape of the bagging more closely to the shape of the semi-finished part.

16. The method according to claim 13, wherein the bagging comprises at least one of
   a thickness in the range of approximately 0.2 to 2.0 mm,
   a transparent material, or
   a plurality of bagging segments which are connected to each other in a sealing manner.

17. The method according to claim 13, wherein the bagging comprises at least one of:
   the first material made of a polyamide material,
   the second material made of an ethylene-tetrafluorethylene material,
   the air-tight outer layer of the bagging having a thickness which is greater than a thickness of the inner separation layer of the bagging, or
   the first and second materials, as well as the thicknesses of the air-tight outer layer and the inner separation layer, selected in such a manner that the stiffness of the bagging decreases with increasing temperature.

18. The method according to claim 13, wherein, upon thermoforming the bagging,
   the bagging to be shaped is supported by a surface of a forming tool of a thermoforming apparatus, and
   the bagging supported on the surface of the forming tool is heated such that the bagging assumes a shape corresponding to the surface of the forming tool.

19. The method according to claim 18, wherein, upon thermoforming the bagging, at least one of the following further steps is carried out:
   applying the bagging to be shaped onto a carrier provided with an opening in such a manner that the bagging extends across the opening formed in the carrier,
   displacing the forming tool between a rest position, wherein in the forming tool is disposed at a distance from the opening formed in the carrier, and an operating position, wherein the forming tool protrudes through the opening formed in the carrier,
   pretensioning the bagging extending across the opening formed in the carrier, and
   generating a reduced pressure in a space between the bagging and the surface of the forming tool on which the bagging is supported.

20. The arrangement according to claim 1, wherein the first material is made of a polyamide-6 material.

* * * * *